United States Patent [19]
Sämann

[11] Patent Number: 5,146,146
[45] Date of Patent: Sep. 8, 1992

[54] METHOD AND DEVICE FOR OPERATING ELECTRIC DRIVES

[75] Inventor: Rudolf Sämann, Balingen-Ostdorf, Fed. Rep. of Germany

[73] Assignee: BSG-Schalttechnik GmbH & Co. KG, Balingem, Fed. Rep. of Germany

[21] Appl. No.: 633,678

[22] Filed: Dec. 26, 1990

[30] Foreign Application Priority Data

Dec. 14, 1990 [EP] European Pat. Off. ......... 90124280.0

[51] Int. Cl.⁵ ............................................. H02P 5/40
[52] U.S. Cl. ..................................... 318/768; 318/809
[58] Field of Search ................. 318/768, 769, 749, 809

[56] References Cited

U.S. PATENT DOCUMENTS

| | | |
|---|---|---|
| 3,908,158 | 9/1975 | Studtmann . |
| 4,243,926 | 1/1981 | Phillips ................. 318/798 |
| 4,300,077 | 11/1981 | Katz et al. ............. 318/768 |
| 4,461,985 | 7/1984 | Stitt ...................... 318/772 |

FOREIGN PATENT DOCUMENTS 8103115 8/1982 France .

Primary Examiner—David Smith, Jr.
Attorney, Agent, or Firm—Darby & Darby

[57] ABSTRACT

For operating electric drives, in particular of two-pole and multi-pole asynchronous induction motors intended for driving devices having at least two significantly different operating speeds it is proposed to operate at least one two-pole or multi-pole multi-phase asynchronous induction motor from a single-phase mains supply (L, N) by rendering conductive each of a plurality of power semiconductors (Triac T1, T2, T3) being connected in series to one of the windings (W1, W2, W3) each, only during a half wave of the single-phase supply voltage, in a manner staggered in time relative to the other series-connected semiconductor switches, and successively relative to the latter (FIG. 1).

12 Claims, 3 Drawing Sheets

METHOD AND DEVICE FOR OPERATING ELECTRIC DRIVES

BACKGROUND OF THE INVENTION

The present invention relates to a method according to the preamble of claim 1 and to a device according to the preamble of claim 3, and concerns in particular such forms of electric drives which enable high reduction ratios to be achieved at moderate technical input in the winding area.

It has been known before in connection with induction motors or asynchronous motors to arrange the stator winding in grooves inside the stator cavity in such a distribution that the windings of the individual phases follow each other in correspondence with the displacement in time of the voltages and currents, i.e. at 120°, electrically, in the case of a three-phase a.c. motor.

In the case of multi-phase asynchronous motors, therefore, the time sequence of the peak values of the stator current of the individual phases leads to a magnetic rotary field which, according to the known formula $$n = \frac{\pm .60}{p}$$

leads to n revolutions per minute for a given frequency (f) and a given number of pole pairs (p). The rotor, for example a squirrel cage rotor, tends to follow this rotary field, but does never fully reach the latter's speed. This behavior or the rotor, which is insofar asynchronous, being affected by a certain slip, causes a voltage to be induced in the rotor by the overrunning field, which voltage rises as the slip rate increases. Consequently, the rotor current rises, for a given rotor resistance, in proportion to the slip rate which, as in the case of a transformer, is covered from the primary side, i.e. from the stator, through the action of the magnetic field.

Now, it is general usage in certain applications—an example to be mentioned here is the operation of washing machines, although it is understood that the invention is not restricted to such an application—to make use or single-phase induction motors with two speeds which are usually supplied with current from the likewise single-phase mains available practically everywhere. As the washing machine, which has been mentioned by way of example, is normally operated at two, sometimes very different speeds, namely a highest possible tumbling speed and, on the other hand, the slow washing speeds, which are moreover interrupted by reversing movements, the only single-phase induction motor used in this case is designed in such a way, for example by convenient distribution and assignment of the coil pairs, as to form, for example, a two-pole partial induction motor and a 16-pole partial induction motor so that—as will be explained in more detail further below—speeds of, for example, 3000 min$^{-1}$ and 375 min$^{-1}$, respectively, are obtained, to provide some numerical figures for the better understanding.

It has been found, however, that the desired high speed reduction ratio is very difficult to achieve, even for such combined single-phase induction motors supplied from single-phase mains, and that in addition the cost factor is a problematic aspect, due to the high number of winding coils required.

Now, it is the object of the present invention to provide a method and a device for the operation of electric induction motors which ensure that at least the same, or even higher speed reduction ratios can be achieved, with a reduced input and a lesser number of coil pairs, and at altogether lower cost.

ADVANTAGES OF THE INVENTION

The invention achieves this object with the aid of the characterizing features of claim 1 and of claim 3 and provides the advantage that on the one hand it is now possible to operate a three-phase induction motor, i.e. a three-phase a.c. motor, from a single-phase mains, without greater input, simply by connecting Triacs or other suitable power semiconductors, including MOS-FET or the like, in series with the three winding coils of the three-phase a.c. motor, the semiconductors being driven successively in such a way as to obtain a desirable magnetic rotary field with a frequency reduced to one third, as compared to the frequency of the feeding single-phase a.c. voltage.

Depending on the number of pole pairs p of the induction motor one then obtains the desired reduction, corresponding to the before-mentioned formula.

It will be explained below, with the aid of numerical examples, that the proposed use of a multi-phase motor generally, especially of a three-phase motor, for the operation of washing machines and similar appliances, is favorable not only with respect to the achievement of higher reduction ratios, but also with respect to the required number of coil pairs.

The use of a three-phase induction motor which is energized via directional Triac triggering of its coil windings further does away with the need to use a capacitor of correspondingly high capacitance for low speeds, and reversing the sense of rotation of a three-phase motor is also notably easier than in the case of the usual single-phase induction motor, as this can be effected simply by exchanging the triggering times of two of the Triacs connected in series to the three coils. Moreover, if a three-phase motor is used, the resulting torque is considerably higher, for an otherwise comparable set-up.

Another advantage is seen in the fact that a tachogenerator can be coupled mechanically to the motor so that based on an electronic control circuit of the type anyway required for triggering the Triac, the speed can be controlled in the same manner as usual with certain washing machines and other appliances using two-speed single-phase induction motors.

Another advantage of the present invention lies in the fact that the mean voltage supplied to each winding can be varied by varying the time during which the associated Triac is in the conductive state, so that the torque of the motor, too, can be varied in this manner in response to the measured and the predetermined speed.

Finally, it is similarly possible, based on the existing electronic circuit, to switch over automatically to single-phase high-speed operation if the pre-set speed, i.e. the nominal speed, is equal to or higher than a synchronous speed in switched three-phase operation.

Other advantages reside in the fact that in case of failure of a Triac, for example, in the case of a short-circuit, the speed of the controlled multi-phase motor will not rise, as in the case of a universal motor. In addition, there is no need for an additional electromechanical switch for reversing the speed of the electric motor, and at the same time considerably smoother, low-noise operation is achieved, and considerably lower r.f. interference is ensured as well.

The features specified in the sub-claims permit further advantageous developments and improvements of the invention. For example, if a combined switched-type eight-pole three-phase induction motor and a two-pole single-phase induction motor are used according to a preferred embodiment of the invention, then one achieves the advantageous feature that the low torque made available in the two-pole configuration will exclude any rotary movement as long as water remains in the washing machine, i.e. as long as the water has not been pumped out for the tumbling operation. This provides additional safety in operation of a washing machine, a preferred application of the present invention being that of a washing machine.

However, it should be noted once more that the application for a washing machine, that will be described hereafter by preference, and the numerical values provided hereafter are only meant to support the understanding of the invention and may not in any way be construed as restricting the invention to this field of application.

Finally, another advantage of the present invention is derived from the fact that even in case of failure of a tachogenerator, which is usually employed for closed-loop triggering of the control circuit provided, the maximum drum speed will remain limited to the synchronous speed.

BRIEF DESCRIPTION OF THE DRAWING

Certain embodiments of the invention will be described hereafter in more detail with reference to the drawing in which.

DESCRIPTION OF THE EMBODIMENTS

The basic idea of the present invention consists in that, instead of using conventional complex single-phase induction motors which necessarily comprise a plurality of coil pairs, a multi-phase motor of substantially simpler structure, usually a three-phase a.c. motor, is employed and its coil windings (stator windings) are triggered via Triacs in a predetermined triggering sequence.

Figure 1:
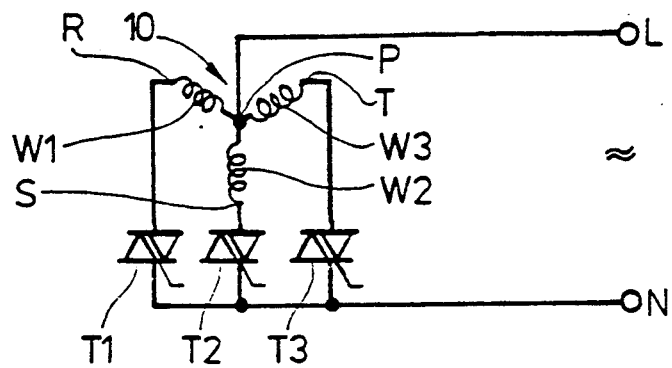
FIG. 1 is a schematic representation of the circuit of a multi-phase induction motor, namely a three-phase a.c. motor, that is controlled via a power semiconductor and supplied from a singe-phase mains.

FIG. 1 shows diagrammatically a three-phase induction motor 10, indicated in the usual manner by its stator winding configuration with its windings W1, W2 and W3 offset relative to each other by 120°, the neutral point P being connected to the one connection L of a single-phase a.c. supply voltage (mains voltage), and the outer coil connections R, S, T being connected to the other connection N of the mains voltage, via controlled semiconductor switches, preferably Triacs T1, T2 and T3.

Figure 2:
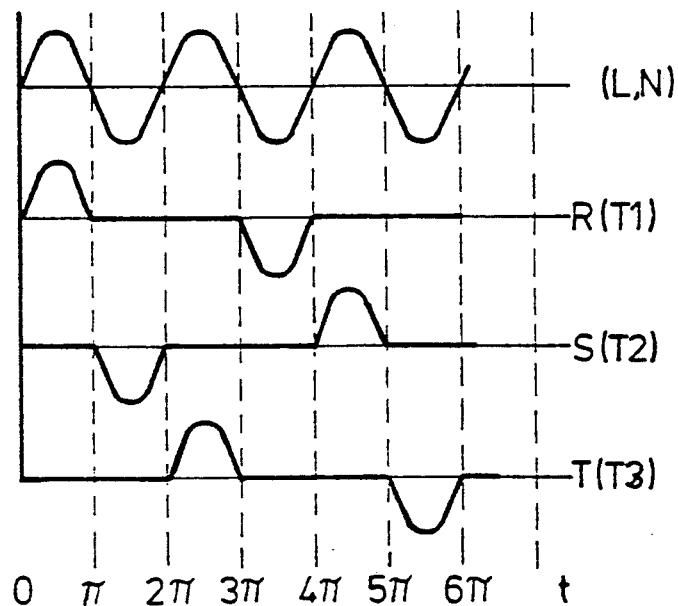
FIG. 2 is a diagram illustrating the feeding single-phase a.c. voltage and, in the lower part, the divided current flow in each winding as it results therefrom, controlled by the Triacs.

The circuit of FIG. 1 shows that a three-phase asynchronous motor or induction motor can be operated from a single-phase mains by connecting the windings successively to the supply voltage for the duration of a half wave of the a.c. supply voltage, via a semiconductor switch or Triac which is then in the conductive state, in such a way that each of the windings W1, W2 and W3 is connected to the main voltage successively in time in the manner shown as an enlarged detail in FIG. 2. For, if each of the Triacs T1, T2 and T3 is rendered conductive in succession for exactly one half wave of the single-phase a.c. voltage, by a control circuit that will be described in more detail further below, with reference to FIG. 2, then the resulting current flow distribution in the individual phases R, S, T or windings of the three-phase a.c. motor according to FIG. 1 leads to a magnetic rotary field with a frequency equalling one third of the frequency of the single-phase a.c. voltage, when a two-pole three-phase a.c. motor is used, or equal to a corresponding sub-multiple or fraction, for a multi-pole induction motor.

The upper portion of the diagram of FIG. 2 shows the curve of the single-phase a.c. mains voltage; if, as mentioned before, the Triac T1, followed by the Triac T2 and then by the Triac T3 are triggered, at intervals of exactly one half wave each, and if this triggering cycle is repeated thereafter, then the current distribution illustrated in the diagram of FIG. 2 is obtained for the three phases R, S and T, as will be readily appreciated. This current distribution means at the same time that each phase winding of a three-phase motor controlled in this manner is supplied with a voltage having no more than one third of the mains frequency of the single-phase a.c. voltage L, N.

Figure 3:
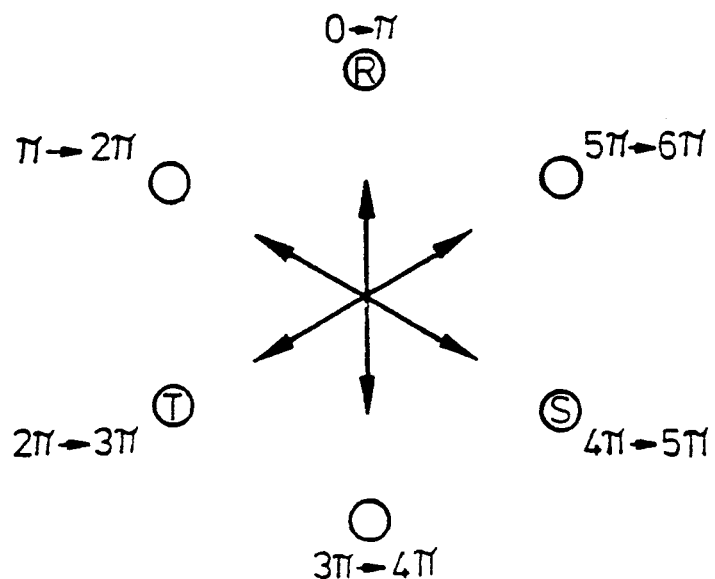
FIG. 3 is a vector diagram illustrating the resulting sense of rotation of the magnetic field, for a two-pole three-phase a.c. motor.

The vector diagram of FIG. 3 shows, corresponding to the current distribution of FIG. 2, the resulting direction of the magnetic field for a two-pole three-phase induction motor.

To say it in other words, this means that the angular speed of the magnetic field, corresponding to the synchronous angular speed driving the rotor in a three-phase asynchronous induction motor controlled in this manner, amounts to only one third of the speed that can be attained by a three-phase a.c. motor supplied in the usual manner from a three-phase mains. If, consequently, a two-pole three-phase a.c. motor rotates at a speed of 3000 min$^{-1}$, for example, at a frequency of the feeding three-phase a.c. mains of 50 Hz, then one obtains by analogy, and if the system is controlled in accordance with the explanations given before and as illustrated in FIG. 1, a speed of only 1000 min$^{-1}$. This is particularly advantageous in certain applications and will be explained hereafter by way of a practical example, by comparison with a single-phase induction motor of the usual type otherwise employed, using intentionally numerical values (without however limiting thereby the scope of the invention). It will be readily understood that such a single-phase induction motor will be used in all cases where single-phase supply voltage is available only. This is true, for example, for every usual domestic mains.

It has been mentioned before that one of the main advantages of the present invention is seen in such applications where the driving motors may be required also to rotate at very low speeds, as in the case of washing machine motors, for example.

In the case of washing machines, one therefore usually employs an electric drive motor having two or three speeds and comprising a two-pole winding for high tumbling speeds, and one or two multi-pole (4, 12, 16 or 24) windings for sub-multiple, i.e. reduced speeds of the kind required for slow speeds or washing motions, including reversing motions.

These extensively employed single-phase induction motors require $2 \times n$ coil pairs in order to attain a speed of 3000:n, at a mains voltage of 50 Hz, n being between 1, 2, 3, 4 ... 12.

As compared to this, the three-phase induction motor discussed before requires $3 \times n$ coil pairs—to provide again concrete numerical values—in order to attain a speed or angular speed of 1000:n, at an identical frequency of the supply voltage of 50 Hz.

In other words, this means that for an assumed number of pole pairs of 16 (n=8) a single-phase induction motor has a speed of 375 min$^{-1}$ and requires 16 coil pairs to achieve this.

In contrast, an eight-pole (n=4) switched three-phase induction motor succeeds in attaining a much more reduced, low speed of 250 min$^{-1}$, requiring only 12 coil pairs.

The advantages achievable by the use of a switched-type three-phase induction motor in combination with a single-phase supply mains are, therefore, surprisingly important, and this not only as regards the reduction by 25% of the number of coil pairs needed, but also because considerably lower speeds can be attained for the slow motions.

A particularly important advantage is obtained by the use of a motor suited for two speeds—this is absolutely comparable to the double-structure single-phase motors used heretofore—making use of a conventional two-pole single-phase configuration for the high speeds and of a switched three-phase multi-pole induction motor for the low speeds. Assuming in this case that n=4, one obtains a combined induction motor of the kind according to the invention offering two rotary speeds of 3000 min$^{-1}$ and 250 min$^{-2}$, respectively, and requiring a total number of coil pairs of $12+2=14$. Besides, one arrives in this manner, in combination with a mechanical speed reduction, at a washing machine offering the desirable very high tumbling speed and particularly well suited reduced washing and reversing speeds, as will be explained in more detail further below.

If one compares such a motor having 14 coil pairs with a usual combined single-phase motor using a two-pole and a sixteen-pole configuration for the two speeds, as described before, which provides in this case speeds of 3000 min$^{-1}$ and 375 min$^{-1}$, then such a motor requires $16+2=18$ coil pairs. This demonstrates, too, that the switched three-phase induction motor has a much simpler and low-cost structure and offers in addition a higher reduction ratio, combined with an improved torque and lower technical input.

Figure 4:
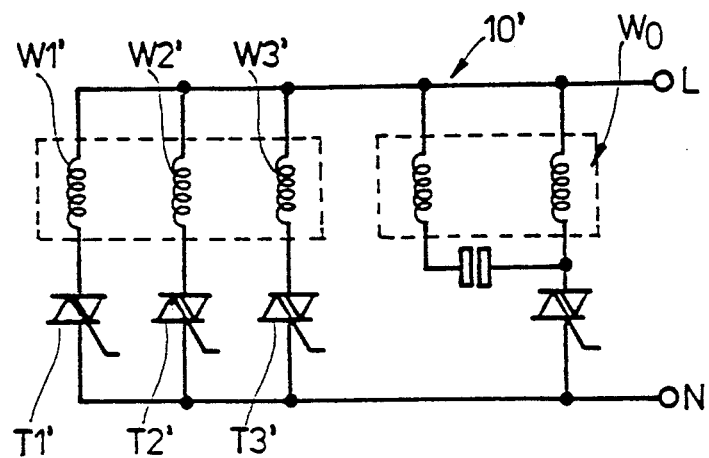
FIG. 4 shows a preferred embodiment of a combined switched-type three-phase induction motor and of a two-pole single-phase induction motor for use in a washing machine.

A combined motor according to the invention with a multi-pole switched three-phase winding for low speed and a two-pole single-phase winding for high speed is illustrated diagrammatically in FIG. 4 and indicated by 10'. The three windings for the switched "three-phase a.c. structure" are indicated by W1', W2' and W3'; these windings are also supplied by the single-phase mains L, N, via intermediary power semiconductors, usually Triacs T1', T2' and T3' that can be switched to be rendered conductive in both directions, with an additional two-pole single-phase a.c. current winding To being provided for high speeds, in parallel to the described stator winding area.

Figure 5:
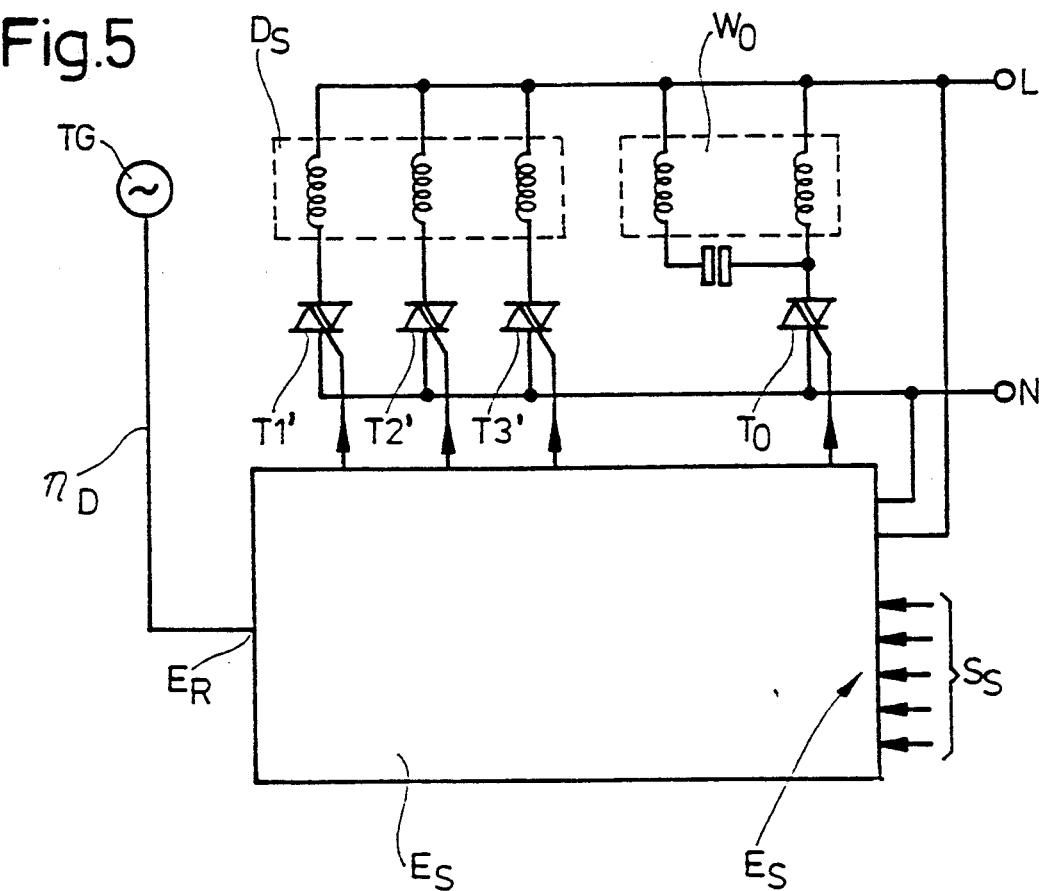
FIG. 5 illustrates in detail the relations between the combined induction motor according to FIG. 4 and an electronic control circuit controlling it, while FIG. 6 finally shows one possible embodiment of an electronic control circuit using a conventional triggering module (IC) for a Triac, with a special external protective circuit for the event of a Triac failure (short-circuit).

The complete circuit diagram is illustrated in FIG. 5 and comprises an electronic control circuit ES which is supplied by a speed feedback signal $n_D$ at its input $E_R$ and with other control signals $S_S$ at its input area $E_S$. These other control signals may originate from the program sequence of the appliance equipped with such a motor, for example the program sequence control of the washing machine, or from some manual actuation by an operator.

The electronic control circuit ES controls the thyristors T1', T2', T3' of the—preferably eight-pole—three-phase a.c. motor structure $D_S$ according to the predetermined cycle sequence, and alternatively the thyristor To that is connected in series to the two-pole winding area Wo of the single-phase induction motor structure. All windings are connected to the single-phase mains voltage L, N in parallel.

An induction motor circuit structure of this type provides certain additional advantages which are seen, for example, in the fact that no auxiliary capacitors are required for the low speed range, as would otherwise be the case; in addition, the sense of rotation can be reversed without any problems in the low speed range, by changing the activation frequency of two of the switching Triacs provided. Moreover, the torque achievable is considerably higher, as compared with motors of the known type of construction and of similar dimensions.

If, as illustrated by FIG. 5, a tachogenerator coupled mechanically to the motor shaft is used, then the speed can be monitored and controlled, by means of the electronic control circuit ES, in the same manner as known from certain known washing machines using two-speed induction motors.

By designing the electronic control circuit ES in a convenient manner it is further possible to control the mean value of the voltage supplied to each winding of the multi-phase motor structure (and, besides, to the windings of the single-phase motor structure as well) by varying the phase angle, i.e. the leading phase, of the respective Triac. In this way, it is also possible to vary the torque produced by the motor, in response to the speed measured and the predetermined desired speed.

The electronic control circuit ES is further capable of switching over automatically to single-phase high-speed operation when the desired speed is equal or higher than the synchronous speed in switched three-phase operation.

Regarded in more detail, the induction motor structure with the associated electronic control circuit according to FIG. 5 may be designed in such a way as to combine in itself an eight-pole three-phase induction motor and a two-pole single-phase induction motor, a design which is particularly well suited for washing machines which have to attain tumbling speeds of 1000 min$^{-1}$ up to 1500 min$^{-1}$, making use of suitable V-belt speed-reduction ratios.

Based on the reduction ratio of 2.8 provided by the V-belt transmission, one achieves for example a maximum tumbling speed of 1070 min$^{-1}$ and, in the operating mode using the Triacs, a preferred slow speed of only 89 min$^{-1}$, these data being suited for a washing machine having a mean tumbling speed of 1000 min$^{-1}$.

In the low speed range, the speed and the reversing operation are monitored and controlled by the electronic control circuit, making use of the switched-type three-phase motor structure, while the controlled speed has to be sought only for the high tumbling speeds if the two-pole single-phase configuration is employed for this purpose. A drive system having these data resembles to a certain degree a universal motor equipped with an electronic control circuit, but is significantly less cost-intensive and provides in addition a number of advantages in operation as follows:

in case of failure of a Triac, for example if the latter assumes a short-circuit state, the speed does not rise as in the case of a universal motor.

No additional electromechanical switch is required for reversing processes.

A washing machine equipped with such a drive structure operates at considerably less noise and produces significantly less r.f. interference.

The low torque made available by the two-pole single-phase induction motor configuration prevents the machine from operating in the tumbling mode as long as water remains in the machine, i.e. if some trouble has occurred in this respect.

Finally, in the event the tachogenerator should fail, the maximum drum speed will be limited to the synchronous speed which is anyway never reached with induction motors.

Figure 6:
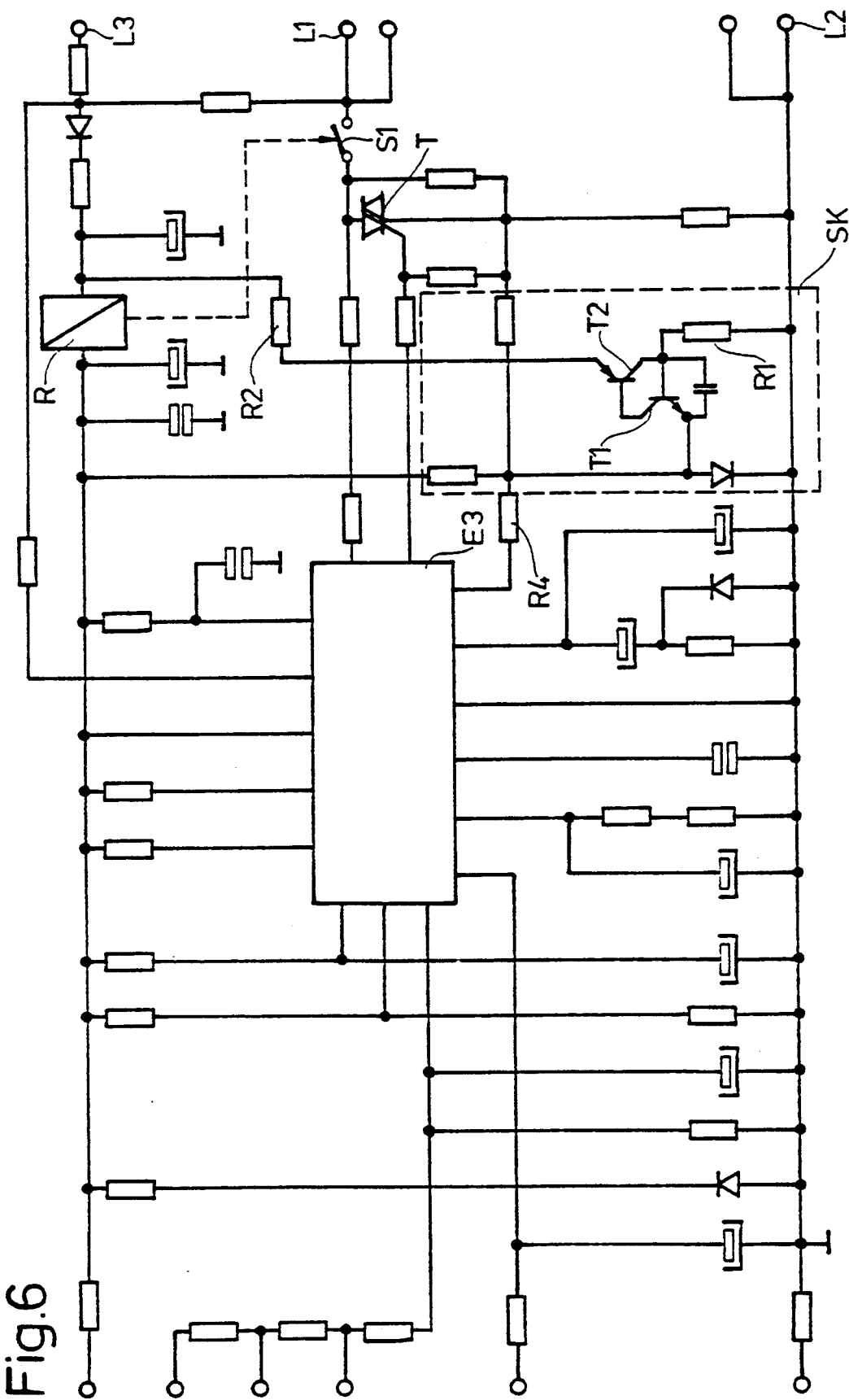

The representation of FIG. 6 finally shows a protective circuit in combination with a Triac drive circuit. The Triac is generally indicated by T and is driven in this case by a conventional integrated circuit IC1 which may, for example, take the form of an analog speed controller and which is commercially available under the designation TDA 1085 C.

The numerous external circuit elements of the IC1 need not be described here in detail, these being of the usual kind. It can be seen, however, that an additional switch S1, which is switched by a relay R and designed as a normally open contact, is provided and connected in series to the Triac output connections L1, L2. The relay R in its turn has its relay winding connected in series to the supply connection L1 for the IC1 so that it is normally excited thus keeping its relay contact S1 in the closed state.

There is further provided a sensor circuit Sk capable of detecting a short circuit of the Triac T in a suitable manner. This is achieved either by scanning the potential present at the Triac main electrodes, or based on the particular method of operation of the IC1. If the sensor circuit Sk responds, then the relay R is deenergized thereby opening its relay switch S1 connected in series to the Triac connections. In the case of the circuit illustrated in FIG. 6, the speed controller IC1 TDA 1085 C functions in such a way that the voltage present at the connection E3 will drop to negative values only in the short-circuited state of the Triac. If this happens, negative pulses will be obtained at the connection E3 every time the motor is reversed. This has the result that the cathode of the transistor T1 of a transistor circuit combination consisting of T1 and T2, which acts as a common thyristor, gets negative via the resistor R1, the gate connection of T1 being connected to frame potential via R1. Once the transistors T1, T2 have been rendered conductive, a current bypass is established via R2, T2, T1 and D1 to frame so that the circuit and, thus, the relay R are deenergized. It goes without saying that a normal thyristor can be used for this purpose, too.

Still another advantageous aspect of the present invention, that should be additionally stressed, is obtained in connection with the whole circuit according to FIG. 5 if instead of switching the series Triacs T1', T2' and T3' fully through during their respective conductive phases, one makes use of the additional phase-control possibilities, as indicated before. To say it in other words, it is also possible by suitable phase control to limit more strictly, during the respective active phase for each winding, the period of time during which the respective Triac is actually conductive, i.e. the respective winding is effectively connected to mains voltage. It is thus possible to reproduce very exactly defined speeds, in particular by making use of the actual-value signal received from the tachogenerator TG. Suitable components for implementing a speed control using series Triacs of the phase-control type are, for example, the before-mentioned integrated circuits as illustrated in FIG. 6 (IC component TDA 1085 C.).

It is thus possible, by additional application of a phase control and making use of the series Triacs anyway available, to implement a particularly versatile speed control capable of following any setpoint input.

Finally, it should be noted that the claim and, in particular, the main claim constitute attempts at formulating the invention, without profound knowledge of the state of the art, and that, therefore, they may not be interpreted as having a prejudicial effect. Consequently, it is understood that all features described and illustrated in the specification, the claims and the drawing are essential to the invention and may be incorporated in the claims individually or in any combination, without reducing the disclosure content of the main claim.

I claim:

1. A device for operating an asynchronous induction motor, comprising:

a multi-pole, multi-phase asynchronous induction motor having windings, the windings of said motor being subject to connection at one end of each said winding to a first line of a single phase power supply;

a plurality of controlled semiconductor switches, said controlled semiconductor switches being connected respectively to the other ends of said motor windings, and being subject to connection in series with the associated winding to a second line of said single phase power supply;

circuit means for rendering conductive said controlled semiconductor switches only during a half of a voltage wave of said power supply, said controlled semiconductor switches being rendered conductive one at a time in a successive sequence to produce a rotary magnetic field in said multi-phase motor with a frequency which is less than the frequency of the signal phase power supply, said rotating field frequency being related to the number of said windings;

a respective control switch in series with each one of said controlled semiconductor switches;

a respective relay controlling the opening and closing of each of said control switches, each one of said relays opening said associated control switch when said associated controlled semiconductor switch becomes short circuited; and respective sensing means for detecting a short circuited condition of each one of said controlled semiconductor switches and for operating the associated relay to open the associated control switch when a short circuit state of said controlled semiconductor switch is detected.

2. A device as in claim 1, and further comprising a single phase induction motor having windings for connection across said single phase power supply, said single phase and multi-phase motors having at least two significantly different speeds;
switch means for turning said single phase motor on and off and for carrying the operating current of said single phase motor.

3. A device as in claim 2, wherein said multi-phase induction motor is one of a two pole and a multi-pole pair motor, and said single phase induction motor is one of a two pole and a multi-pole pair motor, said multi-phase and single phase motors being arranged in one motor housing.

4. A device as in claim 3, wherein said multi-phase induction motor has 8 poles and is operable with three phase power input, and said single phase induction motor has two poles, whereby the device can operate machines with electrically switchable speeds.

5. A device as in claim 4, wherein said machine is a washing machine, having a washing cycle driven by said multi-phase motor and a tumbling cycle driven by said single phase motor.

6. A device as in claim 1, wherein the multi-phase motor has three windings and the number of said controlled semiconductor switches is three, further comprising control circuit means providing control signals determining the program sequence of a machine, said control circuit means being operable to change the time sequence for rendering conductive two of the three controlled semiconductor switches, whereby reverse operation of the multi-phase motor is provided.

7. A device as in claim 1, wherein said controlled semiconductor switches are Triacs.

8. Device according to claim 7, further comprising control circuit means for programming operation of said motor, wherein each of said Triacs is additionally driven, during the duration of its respective half wave, by the control circuit means with phase control so that the time during which each said triac is conductive is shorter than the duration of one half wave.

9. Device according to claim 8, further comprising a tachogenerator, wherein the phase control of each Triac is implemented as a speed control, an actual-value feedback signal of the tachogenerator being compared to predetermined speed setpoint values by said control circuit means.

10. A device as in claim 1, wherein said respective relay associated with each one of said control switches maintains said associated control switch in a closed state when said relay is powered, said control switch reverting to an open state when said relay is deenergized, and said sensing means for detecting a short circuit condition for each one of said controlled semiconductor switches, respectively, being operable to bypass current from the associated relay when a short circuit is sensed in the associated controlled semiconductor switch, whereby said control switch in series with said short circuited controlled semiconductor switch opens to isolate the associated winding from the power supply.

11. A method of operating electric drives for driving machines having at least significantly different operating speeds, such as washing machines or the like, comprising the steps:
a. providing at least one of a two-pole and a multi-pole pair multi-phase asynchronous induction motor of a construction conventionally driven on a poly-phase power supply;
b. connecting one end of each winding of said polyphase motor to one line of a single-phase power supply;
c. connecting a respective controlled semiconductor switch between the other end of each said winding and the other line of said single-phase power supply;
d. providing circuit means for rendering conductive said controlled semiconductor switches only during a half wave of said power supply;
e. providing a respective control switch in series with each one of said controlled semiconductor switches;
f. providing a respective relay controlling the opening and closing of each one of said control switches, each one of said relays opening said associated control switch when said associated controlled semiconductor switch becomes short circuited;
g. providing respective sensing means for detecting a short circuited condition of each one of said controlled semiconductor switches and for operating the associated relay to open the associated control switch when a short circuit state of said controlled semiconductor switch is detected; and
h. rendering said semiconductor switches conductive one at a time in a successive sequence to produce a rotory magnetic field in said multi-phase motor with a frequency which is less than the frequency of said single-phase power supply.

12. A method as in claim 11, further comprising the steps:
i. providing a conventional single-phase motor; and
j. connecting said single-phase motor across said single-phase power supply, said single-phase motor being connected with means for turning said single-phase motor on and off.

* * * * *